United States Patent
Benito Lopez et al.

(10) Patent No.: US 10,245,763 B2
(45) Date of Patent: Apr. 2, 2019

(54) METHOD FOR THE PRODUCTION OF SOLID SURFACES FOR CONSTRUCTION

(71) Applicant: COSENTINO RESEARCH AND DEVELOPMENT, S.L, Cantoria (ES)

(72) Inventors: Jose Manuel Benito Lopez, Cantoria (ES); Juan Antonio Jara Guerrero, Cantoria (ES)

(73) Assignee: COSENTINO RESEARCH AND DEVELOPMENT, S.L., Cantoria (Almeria) (ES)

( * ) Notice: Subject to any disclaimer, the term of this patent is extended or adjusted under 35 U.S.C. 154(b) by 577 days.

(21) Appl. No.: 14/414,135

(22) PCT Filed: Jul. 9, 2013

(86) PCT No.: PCT/ES2013/070491
§ 371 (c)(1),
(2) Date: Apr. 13, 2015

(87) PCT Pub. No.: WO2014/009585
PCT Pub. Date: Jan. 16, 2014

(65) Prior Publication Data
US 2015/0209984 A1    Jul. 30, 2015

(30) Foreign Application Priority Data
Jul. 11, 2012   (ES) .................................. 201231084

(51) Int. Cl.
*B28B 3/02*         (2006.01)
*B29C 43/30*        (2006.01)
(Continued)

(52) U.S. Cl.
CPC ............ *B29C 43/305* (2013.01); *B28B 1/005* (2013.01); *B28B 17/026* (2013.01); *C04B 33/04* (2013.01);
(Continued)

(58) Field of Classification Search
CPC .............................. B29C 43/20; C04B 35/626
See application file for complete search history.

(56) References Cited

U.S. PATENT DOCUMENTS 3,754,713 A * 8/1973 Kienast .................... B03C 1/30
241/19
4,822,541 A * 4/1989 Nagai ...................... B28B 1/50
264/235

(Continued)

FOREIGN PATENT DOCUMENTS

| EP | 0 604 692 A1 | 7/1994 |
| JP | 51-16310 A | 2/1976 |
| WO | 2011/128876 A1 | 3/2011 |

OTHER PUBLICATIONS

International Seach Report for PCT/ES2013/070491 dated Sep. 26, 2013.

*Primary Examiner* — Galen H Hauth
(74) *Attorney, Agent, or Firm* — Sughrue Mion, PLLC

(57) ABSTRACT

The invention relates to a method for the production of solid surfaces for construction, in particular large boards made from completely inorganic components, for use as kitchen worktops, bathroom surfaces, building cladding materials, flooring and for other uses related to the field of construction. The invention is suitable for both indoor and outdoor environments.

22 Claims, 2 Drawing Sheets

(51) Int. Cl.
 E04C 2/02 (2006.01)
 E04C 2/26 (2006.01)
 C04B 33/04 (2006.01)
 C04B 33/14 (2006.01)
 C04B 33/30 (2006.01)
 C04B 35/626 (2006.01)
 E04C 2/04 (2006.01)
 B28B 1/00 (2006.01)
 B28B 17/02 (2006.01)
 C04B 33/132 (2006.01)
 C04B 33/20 (2006.01)
 C04B 33/32 (2006.01)
 C04B 33/10 (2006.01)
 B29L 7/00 (2006.01)

(52) U.S. Cl.
 CPC .......... *C04B 33/10* (2013.01); *C04B 33/1324* (2013.01); *C04B 33/14* (2013.01); *C04B 33/20* (2013.01); *C04B 33/30* (2013.01); *C04B 33/32* (2013.01); *C04B 35/626* (2013.01); *C04B 35/6261* (2013.01); *C04B 35/62625* (2013.01); *C04B 35/62655* (2013.01); *E04C 2/02* (2013.01); *E04C 2/04* (2013.01); *E04C 2/26* (2013.01); *B29L 2007/002* (2013.01); *C04B 2235/3241* (2013.01); *C04B 2235/3272* (2013.01); *C04B 2235/3275* (2013.01); *C04B 2235/3281* (2013.01); *C04B 2235/36* (2013.01); *C04B 2235/442* (2013.01); *C04B 2235/5427* (2013.01); *C04B 2235/94* (2013.01); *Y02P 40/69* (2015.11)

(56) References Cited

U.S. PATENT DOCUMENTS

| | | | |
|---|---|---|---|
| 5,145,627 A * | 9/1992 | Berion | B28B 5/027 264/113 |
| 5,707,770 A * | 1/1998 | Tanikawa | G03G 13/20 430/108.3 |
| 5,935,617 A * | 8/1999 | Uchida | A23G 3/2023 425/134 |
| 8,178,012 B1 * | 5/2012 | Khan | A61C 13/082 264/16 |
| 2009/0291316 A1 * | 11/2009 | Rauch | A44C 17/007 428/542.2 |
| 2010/0194005 A1 * | 8/2010 | Toncelli | B28B 1/005 264/650 |
| 2013/0248625 A1 * | 9/2013 | Arnau Villanova | B02C 17/18 241/5 |

* cited by examiner

METHOD FOR THE PRODUCTION OF SOLID SURFACES FOR CONSTRUCTION

TECHNICAL FIELD OF THE INVENTION

The present invention relates to a method for the production of solid surfaces, in particular large slabs or boards made from a completely inorganic component, for use as kitchen worktops, bathroom surfaces, building cladding material, flooring and for other uses related with the field of construction. The invention is suitable for both indoor and outdoor environments.

BACKGROUND OF THE INVENTION

Several materials can be used today as solid surfaces for the construction sector, but all of them have a certain limitation restricting their use.

These materials for construction can include, among others, wood. The use of wood as a surface for construction is widely known but it is a material that promotes bacterial growth, easily catches fire and needs periodic maintenance care to prevent degradation that leads to loss in appearance. These drawbacks mean that the product is not suitable in environments which require a high hygiene standard or are close to heat sources.

Steel is also a material known since long ago as a solid surface for construction. One of the drawbacks of applying steel as a surface for construction is its low scratch resistance and limited capacity for being embellished in addition to the possibility of corrosion over time.

Another material which can be used as a solid surface in the construction sector is stone agglomerates. Patent document ES 2 187 313 belonging to the owner of the present invention describes a method for preparing a stone agglomerate using polyester resin as a binder. The properties of such products can include, among others, high scratch resistance, large color variety, different surface finishing alternatives, high mechanical properties or the possibility of being able to confer anti-bacterial properties to the article. However, they have the technical limitation of degrading product appearance as a result of UV radiation. Due to this deficiency, there are different uses in the field of construction for which the product is not entirely suitable, such as, for example, for outdoor use (façades, balconies, courtyards, public works or similar environments).

Another type of stone agglomerates which can be used outdoors are those using cement as a binder. The deficiencies of these materials can include, among others, low acid resistance, the limitations existing for producing a highly aesthetic article or high water absorption of these surfaces, which promotes fungal growth and bacterial proliferation, causing this product to be unsuitable in environments which require a high hygiene standard.

Glass agglomerates are another type of materials which can be used as a solid surface in the field of construction, but they have several drawbacks restricting their use. The deficiencies of these products can include, among others, brittleness, low scratch resistance, design and volume limitations and the possibility of developing air trapped inside the article.

Natural stone is one of the materials most widely used as a solid surface in the construction sector. These materials usually have a high porosity so they tend to retain water and get stained. Furthermore, since they are materials obtained as such from nature, it is not possible to obtain large products with any assurance or with homogeneous appearance in the entire stone block from which said product is extracted, furthermore, within one and the same natural stone block, the products that are extracted vary in appearances and tones. As regards mechanical strength, articles made from natural stone have lower strength than that of other materials, such as steel or artificial stone.

Ceramic materials are also widely used as solid surfaces in the field of construction. Italian patent document IT 1,311,858 describes a method for producing slabs of ceramic material consisting of preparing a mixture made up of a granulate obtained from the granulation of natural stone materials or ceramic materials (also known in the art as "grog" or "precooked materials") and a binding step consisting of ceramic powders which are mixed with a water-based inorganic binder, the resulting final mixture being molded and subjected to vibrating compression under vacuum. Furthermore, the appearance of articles used in the construction sector is increasingly important in recent years, not only in products intended for interior or exterior claddings, but also in kitchen worktops, bathroom surfaces, stairs, coatings or similar uses and the ceramic products known today have limited possibilities as regards embellishment, mainly in the entire volume of the article.

Based on the foregoing, the object of the present invention is to provide a novel method for producing boards made from inorganic components which combine the advantages of all the surfaces for construction known in the state of the art and do not have any of the deficiencies mentioned above. The properties of the article obtained by the method of the present invention are as follows: being chemically resistant, highly scratch resistant, incombustible, recyclable, resistant to UV radiation, resistant to sudden temperature changes as well as wear and tear, having a large size which allows easier product installation with smaller number of joints, high mechanical strength, thermal insulation capacity and insignificant thermal expansion, which product furthermore has a great variety of and contains many aesthetic elements in the entire volume of the board, i.e., in the three dimensions of the product.

DESCRIPTION OF THE INVENTION

The present invention relates to a method for the production of large boards made from a completely inorganic component and suitable for both indoor and outdoor environments, comprising the following phases:
  a) storing raw materials,
  b) controlled metering of different materials,
  c) dry milling or wet milling the materials,
  d) storing the mixture and/or formulation obtained in step c),
  e) processing and adding color pigments to a proportion of the mixture and/or formulation stored in d), obtaining a colored mixture and/or formulation,
  f) mixing the initial formulation with the colored formulation (obtained in step e), obtaining a colored mixture,
  g) in the case of wet milling, drying by atomization until obtaining a homogeneous colored powder with a specific particle size and moisture,
  h) storing the different colored powders, maintaining their corresponding moisture level or wetting them depending on the type of milling process performed,
  i) metering the different colored powders on a conveyor belt and applying different embellishments in the volume and on the surface,
  j) compacting the colored powders,
  k) sizing the end part by means of cutting, l) surface embellishment process,
m) pressing the colored powders, optionally providing embossment to the end part by means of incorporating a structure on the pressing surface,
n) embellishing the surface of the pressed board which can be carried out before and/or after the drying process,
o) drying,
p) cooking the embellished board, and
q) calibrating, polishing, cutting or beveling edges of the board.

A large compacted board with aesthetic effects in the entire volume and on the surface thereof is obtained with this method.

DETAILED DESCRIPTION OF THE INVENTION

The object of this invention is to establish a method which allows obtaining a compacted inorganic product having the following properties: being completely chemically resistant, highly scratch resistant, incombustible, recyclable, resistant to UV radiation, resistant to sudden temperature changes as well as wear and tear, having a large size which allows easier product installation reducing the number of joints, high mechanical strength, thermal insulation capacity and insignificant thermal expansion, which product furthermore has a great variety of and contains many aesthetic elements in the entire volume of the board, i.e., in the three dimensions of the product.

Figure 1:
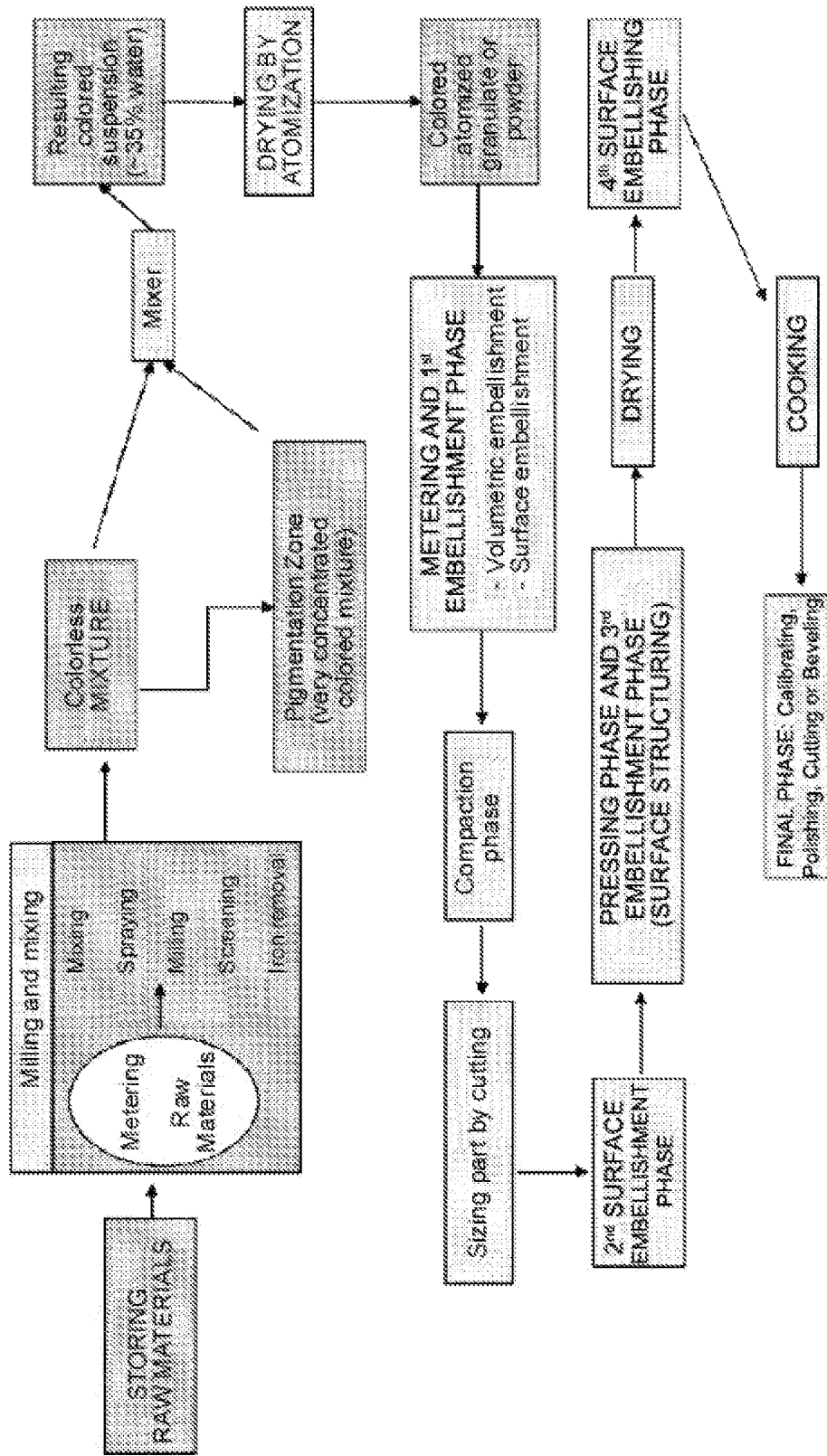
FIG. 1 depicts a diagram of the process of the present invention.

Said process consists of the following phases as illustrated in FIG. 1 a) storing raw materials,
b) controlled metering of different materials,
c) dry milling or wet milling the materials,
d) storing the mixture and/or formulation obtained in step c),
e) processing and adding color pigments to a proportion of the mixture and/or formulation stored in d), obtaining a colored mixture and/or formulation,
f) mixing the initial formulation with the colored formulation (obtained in step e), obtaining a colored mixture,
g) in the case of wet milling, drying by atomization until obtaining a homogeneous colored powder with a specific particle size and moisture,
h) storing the different colored powders, maintaining their corresponding moisture level or wetting them depending on the type of milling process performed,
i) metering the different colored powders on a conveyor belt and applying different embellishments in the volume and on the surface,
j) compacting the colored powders,
k) sizing the end part by means of cutting,
l) surface embellishment process,
m) pressing the colored powders, optionally providing embossment to the end part by means of incorporating a structure on the pressing surface,
n) embellishing the surface of the pressed board which can be carried out before and/or after the drying process,
o) drying,
p) cooking the embellished board, and
q) calibrating, polishing, cutting or beveling edges of the board.

The process is initiated in the raw material storage zone where there are arranged different inorganic materials of the type: feldspars, porphyries, granites, syenites, bentonites, basalts, nephelines, carbonates, clays, silicates, boron salts, sands, kaolins, talcs, alumina, glass materials, recycled glass, recycled porcelains, recycled stoneware, uncooked remainders of the process itself and similar materials, in duly classified independent receptacles, and with a grain size less than 900 mm, preferably less than 500 mm. If these materials are processed into micronized size, it is preferable to unload them directly to silo. Subsequently, by means of mechanical conveyance, for example, through a mechanical blade, a conveyor belt or a pneumatic conveyor, the different inorganic materials are deposited in the metering hoppers, there being a specific metering hopper for each of the components that may form part of the formulation of the product.

Each of the components is added in a controlled manner from these metering hoppers to the raw material milling step. This metering step can be carried out through conveying elements, such as conveyor belts, pneumatic conveying systems or through direct unloading. There is a great variability in the compositions of the end product which depend on the color, thickness, texture, etc., however there are certain components that are common to all of them. The ranges of percentage by weight of these components are provided in detail below:

clays=10-60%
feldspars=5-80%
kaolins=5-40%
glass materials=0-35%
recycled materials=5-15%.

Once the first mixture of the different components is made, it is subjected to a milling process, which can be dry milling, usually performed in hammer or pendulum mills, or wet milling, usually performed in continuous or batch ball mills. In this step, the size of the materials entering the mill is reduced.

If wet milling is performed, a wet inorganic suspension with a specific grain size distribution, a particle size less than 200 microns, a solid content between 55% and 75%, preferably 65%, and a specific viscosity of 1000 mPa s, is obtained at the outlet of this step.

In the case of dry milling, it is usually performed by means of hammer or pendulum mills. In this process, the material is fragmented, maintaining both particle aggregates and agglomerates, the particle size of the resulting mixture being greater than 300 μm.

In the case of wet milling, double screening of the mixture takes place at the outlet of the mill: a first screening with a first vibrating screen through which the bulk reject is removed and a finer second screening whereby the mixture with the desired particle size is obtained by means of a high frequency vibrating screen. The bulk reject is recirculated to the inlet of the mill to reduce its size until reaching the particle size, solid content as well as viscosity conditions previously described.

After these processes, the mixture with the defined characteristics is subjected to an iron removal step, in which iron-contributing contaminants are eliminated. Different methods such as, electromagnetic iron removers for removing iron by gravity, electromagnetic iron removers for removing iron by pressure and iron removers with permanent magnets, can be used to perform this process. The process continues in the mixture storage zone where wet inorganic materials already free of metal elements having between 45% and 25% of water, preferably 35%, and a particle size preferably less than 200 microns, are collected. At this point of the process, a fraction of the mixture is separated for use in the color preparation phase, the proportion of which varies depending on the total of the mixture to be colored.

In the coloring step, a small fraction of the mixture is separated and inorganic pigments derived from the glass and ceramic sector such as iron oxide, copper oxide, cobalt oxide, chromium oxide, etc., are added thereto, and they are mixed uniformly until obtaining a homogeneous colored fraction. This operation is performed by means of using dilutors, stirrers, mixers and/or mixing mills. The fraction of the mixture separated for coloring depends completely on the production and on the type of color to be produced. The added amount of pigment represents between 0.1 and 20% by weight with respect to the total weight of the mixture.

This colored fraction is mixed with the rest of the formulation giving rise to an inorganic colored mixture which goes to a tank with controlled mechanical stirring.

The method continues with the drying step. In this case, the device used for reducing the water content of the mixture is a drying tower for drying by atomization. The moisture ranging between 45% and 25%, preferably 35%, decreases until obtaining a product with a water content ranging between 4% and 8%, preferably 7%. The colored mixture is pumped by means of piston pumps to the spraying system of the drying tower. The finely sprayed and split mixture is dried by contacting it with a hot gas flow inside the drying chamber. The hot gas inlet temperature is between 500 and 700° C., preferably 600° C.

The colored powder with moisture of between 4-8%, preferably 7%, is collected in the base of the tower. This colored powder is unloaded onto a conveyor belt and carried to leak-tight silos to preserve the moisture level during storage.

In the case of processing the material in dry conditions, the colored powder is wetted by means of wetting nozzles to reach moisture of between 4-8%, preferably 7%.

The colored powder is mechanically conveyed by means of conveyor belts from this sector to feeding hoppers for feeding the embellishing, compacting and pressing line.

The method continues with the addition and controlled distribution on a conveyor belt of different layers, veins, granules, strata, etc., depending on the volumetric and surface design to be achieved, such that a continuous blanket of powder is formed therein, having a size of between 10% and 15%, preferably 12%, greater than the width of the end product to be achieved. Subsequently, there is an elimination step for eliminating burrs depending on the end product to be obtained.

The embellishment can therefore be in the entire volume of the blanket of powder or on the surface thereof. The different embellishing devices are designed such that they can introduce embellishing elements along the entire thickness of the boards in a controlled manner and with high definition, such as, single color effects, shadings, veins (thick and/or thin, defined and/or blurred), spots, scales, granules, atomized powder, thick and/or thin lines, etc. The process of the present invention allows any type of dry or wet printing, etc., unlike current embellishing systems in which such embellishment is produced randomly in a completely uncontrolled manner.

In the compaction phase, the embellished blanket of powder traveling on the conveyor belt is subjected to a pressure of between 50 and 90 kg/cm$^2$, preferably 70 kg/cm$^2$, by means of a pressing station pressing continuously, comprising compacting means in the form of a roller and compacting belt, referred to as precompaction, such that this continuous blanket of powder acquires at the outlet of the roller greater consistency necessary to withstand the subsequent cutting step. The precompaction does not distort the aesthetic pattern obtained in the preceding embellishment phase.

Before pressing, the continuous embellished blanket of colored powder is subjected to a cutting phase by means of a dynamic plate cutting machine with a series of cutting tools, such as diamond blades. A transverse cut is made to obtain the length of the board and two side cuts are made to eliminate burrs from the board and acquire width, obtaining a compact board having a specific format. The rejects obtained in this cutting step are recirculated and diluted with the help of a turbo crusher with blades to be reused in other formulations.

The compacted board is then pressed, where a hydraulic press is used which is unique due to its sizing as it is capable of developing pressures of up to 550 kg/cm$^2$ in which the pressing cycle is determined by the thickness to be obtained. In this step, providing the pressing surface with a certain texture can give rise to designs with embossment on the pressed product. The board is completely compact and uniform at the outlet of the press, having the same composition, density and thickness at all points.

The process continues with drying of the pressed board in a roller dryer powered by natural gas and/or electric burners. This drying process can also be carried out in the cooking phase by adding modules acting as a pre-dryer in the kiln.

Before and/or after drying, the surface of the board can be embellished by means of screen printing inks or printing by injecting ink into the surface. For such embellishment, oversized devices capable of embellishing the entire width and length of the board must be used.

Once these phases have ended, the board is automatically conveyed to a warehouse or deposit, where the product is placed in horizontal storage devices.

Subsequently, the boards go through the cooking phase in a roller kiln fixing the final physical and chemical properties of the product. In the kilns, the pieces are moved over the rollers and the heat necessary for cooking is provided by gas and/or electric burners. The main heat transfer mechanisms present during this process are convection and radiation. Cooking is one of the most important steps of the production process since most of the product characteristics, i.e., mechanical strength, dimensional stability, resistance to chemical agents, ease of cleaning, fire resistance, etc., depend on it. In the cooking process, the temperature goes from 0° C. to a temperature not greater than 1600° C., preferably to 1300° C., necessary for obtaining the final technical characteristics of the cooked product.

Once cooked, the board is stored in a duly classified manner for being finally submitted to the final steps of the process such as cutting the board, calibrating, performing different types of polishing or beveling of the edges of the board, etc., using special equipment derived from the artificial stone, natural stone or ceramic sector.

The process described in detail above allows obtaining a product with a final format of between 3100 mm and 3300 mm long, between 1400 mm and 1450 mm wide and between 4 and 35 mm thick and has the following properties: being chemically resistant, scratch resistant, incombustible, recyclable, resistant to UV radiation, resistant to sudden temperature changes as well as wear and tear, having a large size, mechanical strength, high scratch resistance, thermal insulation capacity and insignificant thermal expansion, with a great variability of embellishing elements both on the surface and in the volume.

Example

The different materials with a grain size less than 500 mm are driven to the metering hoppers from the storage area by means of a conveyor belt.

The formulation used can be as follows:
clays=20-35%
feldspars=5-20%
kaolins=20-30%
glass materials=10-15%
carbonates=5-15%.

Each of the components is added in a controlled manner from these metering hoppers to the raw material milling step.

Once the first mixture of the different components is made, it is subjected to a wet milling process through continuous ball mills to reduce the size of the materials to a particle size less than 200 microns, with a solid content of 65% and a viscosity of 1000 mPa s. Double screening of the mixture takes place at the outlet of the mill: a first screening with a first vibrating screen through which the bulk reject is removed and a finer second screening whereby the mixture with the desired particle size is obtained by means of a high frequency vibrating screen. The reject is recirculated to the inlet of the mill to reduce its size until reaching the particle size, solid content as well as viscosity conditions previously described. After screening, the mixture is subjected to an iron removal step, in which iron-contributing contaminants are eliminated. This process is carried out through an electromagnetic iron remover for removing iron by gravity.

The process continues in the storage zone where the wet mixture already free of metal elements having 35% of water and a particle size less than 200 microns is collected. At this point of the process, a fraction of the formulation is separated for use in the color preparation phase.

In this case, the fraction separated for these purposes is added with 20% by weight of iron oxide and mixed uniformly until obtaining a homogeneous colored formulation fraction. This operation is performed by means of using conventional stirrers.

This colored fraction is mixed with the rest of the formulation giving rise to a colored formulation which goes to a tank with controlled mechanical stirring. The method continues with the drying step. In this case, the device used for reducing the water content of the formulation is a drying tower for drying by atomization. The initial moisture in this phase of the process is 35% and it will be reduced to 7%. The colored formulation is pumped by means of piston pumps to the spraying system of the drying tower. The finely sprayed and split formulation is dried by contacting it with a hot gas flow inside the drying chamber. The hot gas inlet temperature is 600° C.

The colored powder with moisture of 7% is collected in the base of the tower. This colored powder is unloaded onto a conveyor belt and carried to leak-tight silos to preserve the moisture level during storage.

The colored powder is mechanically conveyed by means of conveyor belts from this sector to feeding hoppers for feeding the embellishment line from which it is unloaded onto a belt for forming veins continuously, in this case. Jointly unloading these veins gives rise to a continuous blanket of colored powder.

In the subsequent compaction phase, the blanket of colored powder traveling on the conveyor belt is subjected to a pressure of 70 kg/cm$^2$, by means of a pressing station pressing continuously, comprising compacting means in the form of a roller and compacting belt. A continuous blanket of powder is obtained from this precompaction at the outlet of the roller where it acquires greater consistency necessary to withstand the subsequent cutting step.

Before pressing, the blanket of colored powder is subjected to a cutting phase by means of a dynamic plate cutting machine with diamond blades. A transverse cut is made (to obtain the length of the board) and two side cuts are made (to eliminate burrs form the board and acquire width), obtaining a compact board having the desired format. The rejects obtained in this cutting step are recirculated and diluted with the help of a turbo crusher with blades to be reused in other formulations.

The compacted board is then pressed, where a hydraulic press is used which is unique due to its sizing as it is capable of pressing boards for a final format of up to 3300×1450 mm, using up to 550 kg/cm$^2$. The board is completely compact and uniform at the outlet of the press, having the same composition, density and thickness at all points.

The process continues with drying of the pressed board with the help of a horizontal roller dryer powered by natural gas and electricity.

Before drying, the surface of the board can be embellished by means of screen printing inks, in this case, with the conventional machinery for these purposes.

Finally, the board is automatically conveyed to a warehouse or deposit, where the product is placed in horizontal storage devices.

Subsequently, the board goes to the cooking phase in a roller kiln where the necessary heat is provided by natural gas-air burners. In this case, the temperature of the kiln reaches up to 1300° C.

Once cooked, the board is stored in a duly classified manner for being finally submitted to the final steps of the process such as cutting the board, calibrating, performing different types of polishing or beveling of the edges of the board, etc., using conventional special equipment derived from the artificial stone, natural stone or ceramic sector.

The product obtained by this method will have a final format of 3300 mm long, 1450 mm wide and 30 mm thick and the following properties: being chemically resistant, scratch resistant, incombustible, recyclable, resistant to UV radiation, resistant to sudden temperature changes as well as wear and tear, having a large size, mechanical strength, high scratch resistance, thermal insulation capacity and insignificant thermal expansion, with a great variability of embellishing elements both on the surface and in the volume.

Figure 2:
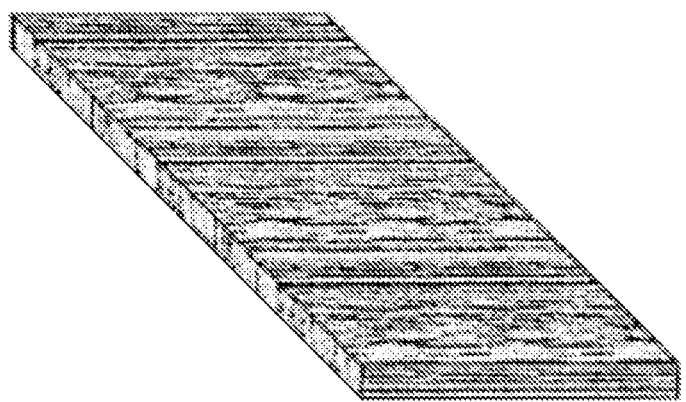
FIGS. 2 and 3 depict end products obtained through the method of the present invention.
Figure 3:
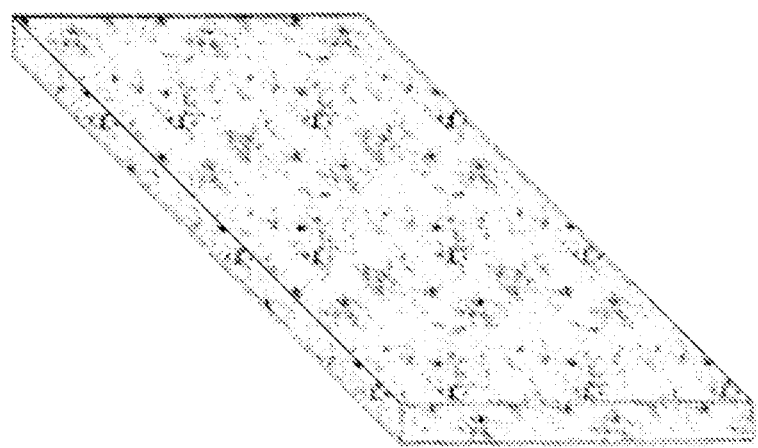

FIGS. 2 and 3 depict end products obtained through the process of the present invention.

The invention claimed is:

1. A method for the production of a board made from materials for construction comprising the following steps:
 a) storing raw materials that are inorganic,
 b) controlled metering different ones of the raw materials,
 c) dry milling or wet milling the raw materials from the controlled metering of step b) to obtain a first mixture,
 d) storing the first mixture obtained in step c),
 e) processing and adding color pigments to a proportion of the first mixture stored in d), obtaining a first colored mixture, f) mixing at least some of the first mixture with the first colored mixture obtained in step e) to obtain a homogenous colored mixture, g) storing different homogenous colored mixtures obtained from steps a) through f) using different color pigments, h) creating a blanket of different homogenous colored mixtures by metering the different homogenous colored mixtures on a conveyor belt to create different embellishments throughout an entire volume of the blanket or throughout at least a portion of an entire volume or a surface of the blanket in a non-homogenous manner, wherein the application of different embellishments comprises controlled distribution onto a conveyor of the different homogenous colored mixtures in order to obtain a desired aesthetic design, i) subsequent to step h), compacting the different homogenous colored mixtures at a compaction pressure to form a compacted board, j) sizing an end part of each compacted board by cutting through an entire thickness of the compacted board, k) pressing the compacted board at a pressure greater than the compaction pressure to form the board for construction, l) drying the pressed board, m) subsequent to drying the pressed board, cooking the pressed board, and n) calibrating, polishing, cutting or beveling edges of the cooked pressed board.

2. The method according to claim 1, wherein the raw materials of step a) are inorganic materials selected from the group consisting of feldspars, porphyries, granites, syenites, bentonites, basalts, nephelines, carbonates, clays, silicates, boron salts, sands, kaolins, talcs, alumina, glass materials, recycled glass, recycled porcelains, and recycled stoneware.

3. The method according to claim 1, wherein a grain size of the inorganic materials is less than 500 mm.

4. The method according to claim 1, wherein the raw material of step a) comprises at least the following formulation in % by weight of the final mixture:
clays=10-60%
feldspars=5-80%
kaolins=5-40%
glass materials=0-35%
recycled materials=5-15%.

5. The method according to claim 1, wherein the metering step is carried out through conveying elements selected from the group consisting of conveyor belts, electric discharge and pneumatic conveying systems.

6. The method according to claim 1, wherein dry milling is performed in step c) through hammer or pendulum mills.

7. The method according to claim 1, wherein wet milling is performed in step c) through pendulum or continuous ball mills.

8. The method according to claim 1, wherein dry milling is performed in step c) that results in particle aggregates and agglomerates with a particle size greater than 300 μm.

9. The method according to claim 1, wherein wet milling is performed in step c) that results in a wet inorganic suspension with a particle size less than 200 μm, a solid content of between 55% and 75% and a viscosity of 1000 mPa s.

10. The method according to claim 1, wherein wet milling is performed in step c) and includes a first screening with a vibrating screen to remove reject and a second screening whereby a desired mixture is obtained.

11. The method according to claim 1, wherein in coloring step e) a fraction of the first mixture is homogeneously mixed with an amount of 0.1% to 20% by weight of pigments selected from the group consisting of iron oxide, copper oxide, cobalt oxide and chromium oxide.

12. The method according to claim 1, wherein in the case of wet milling the raw materials in step c), further drying the homogenous colored mixture in a drying tower for drying by atomization.

13. The method according to claim 1, wherein in the case of wet milling the raw materials in step c), the moisture level of the homogenous colored mixture obtained in step f) is kept between 4-8%.

14. The method according to claim 1, wherein the embellishments from step h) results in a distribution of layers, veins, granules and strata.

15. The method according to claim 1, wherein compacting step i) is performed through a pressing station applying a continuous pressure of between 50 to 90 kg/cm$^2$.

16. The method according to claim 1, wherein pressing step k) is performed through a hydraulic press using a pressure of 550 kg/cm$^2$.

17. The method according to claim 1, wherein cooking step m) is carried out in a roller kiln at a temperature not greater than 1600° C.

18. The method according to claim 1, further comprising providing embossment to an end part of the pressed compacted board from step k) by incorporating a structure on a pressing surface.

19. The method according to claim 1, wherein the step of compacting the different colored mixtures is performed using a roller and compacting belt.

20. The method according to claim 1, wherein the first mixture stored in step d) does not include added pigmentation.

21. The method according to claim 1, wherein the board resulting from step n) is between 3,100 mm-3,300 mm long, between 1,400 mm-1,450 mm wide and between 4 mm-35 mm thick.

22. The method according to claim 1, further comprising the steps of carrying out additional embellishment of at least one of the surface of the cut compacted board or the pressed board.

* * * * *